(12) United States Patent
Heckmann

(10) Patent No.: US 9,202,466 B2
(45) Date of Patent: Dec. 1, 2015

(54) SPOKEN DIALOG SYSTEM USING PROMINENCE

(71) Applicant: HONDA RESEARCH INSTITUTE EUROPE GMBH, Offenbach/Main (DE)

(72) Inventor: Martin Heckmann, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 326 days.

(21) Appl. No.: 13/845,841

(22) Filed: Mar. 18, 2013

(65) Prior Publication Data

US 2013/0262117 A1    Oct. 3, 2013

(30) Foreign Application Priority Data

Mar. 29, 2012  (EP) .................................... 12162032

(51) Int. Cl.
*G10L 15/22*    (2006.01)
*G10L 15/18*    (2013.01)
*G10L 13/04*    (2013.01)

(52) U.S. Cl.
CPC ............. *G10L 15/22* (2013.01); *G10L 15/1807* (2013.01); *G10L 13/04* (2013.01)

(58) Field of Classification Search
CPC .. G10L 15/04; G10L 15/1807; G10L 15/1822
See application file for complete search history.

(56) References Cited

U.S. PATENT DOCUMENTS

| | | | |
|---|---|---|---|
| 7,778,819 B2 | 8/2010 | Bellegarda et al. | |
| 7,996,214 B2 | 8/2011 | Bangalore et al. | |
| 8,756,061 B2 * | 6/2014 | Kalinli et al. | 704/254 |
| 2004/0056907 A1 * | 3/2004 | Sharma et al. | 345/863 |
| 2006/0122834 A1 | 6/2006 | Bennett | |
| 2008/0114603 A1 * | 5/2008 | Desrochers | 704/275 |
| 2009/0048843 A1 * | 2/2009 | Nitisaroj et al. | 704/260 |

(Continued)

FOREIGN PATENT DOCUMENTS

JP    2001-236091 A    8/2001

OTHER PUBLICATIONS

European Search Report dated Jun. 27, 2012 corresponding to European Patent Application No. 12162032.2.

(Continued)

*Primary Examiner* — Douglas Godbold
(74) *Attorney, Agent, or Firm* — Squire Patton Boggs (US) LLP

(57) ABSTRACT

The invention presents a method for analyzing speech in a spoken dialog system, comprising the steps of: accepting an utterance by at least one means for accepting acoustical signals, in particular a microphone, analyzing the utterance and obtaining prosodic cues from the utterance using at least one processing engine, wherein the utterance is evaluated based on the prosodic cues to determine a prominence of parts of the utterance, and wherein the utterance is analyzed to detect at least one marker feature, e.g. a negative statement, indicative of the utterance containing at least one part to replace at least one part in a previous utterance, the part to be replaced in the previous utterance being determined based on the prominence determined for the parts of the previous utterance and the replacement parts being determined based on the prominence of the parts in the utterance, and wherein the previous utterance is evaluated with the replacement part(s).

14 Claims, 4 Drawing Sheets

(56) References Cited

U.S. PATENT DOCUMENTS

2012/0022872 A1* 1/2012 Gruber et al. ............. 704/270.1
2013/0226569 A1* 8/2013 Chandra et al. ............. 704/219
2013/0262096 A1* 10/2013 Wilhelms-Tricarico
et al. ............................ 704/202

OTHER PUBLICATIONS

Lars Schillingmann et al, "Acoustic Packaging and the Learning of Words," IEEE ICDL-EPIROB 2011 (1st Joint IEEE International Conference on Development and Learning and on Epigenetic Robotics), Aug. 27, 2011, XP55030018, retrieved from internet: http://aiweb.techfak.uni-bielefeld.de/files/ICDL-2011-AP-Poster.pdf.
Gina-Anne Levow, "Characterizing and Recognizing Spoken Corrections in Human-Computer Dialogue," Proceeding COLING '98: Proceedings of the 17th International Conference on Computational linguistics, Jan. 1, 1998, pp. 736-742, XP55030034.
Marc Swerts et al., "Corrections in Spoken Dialogue Systems," Oct. 16, 2000, XP007010410, 4 pages.
Ang, J.; Liu, Y. & Shriberg, E., "Automatic dialog act segmentation and classification in multiparty meetings," Proc. ICASSP, 2005, 1, 1061-1064.
Sridhar, R.; Bangalore, S. & Narayanan, S., Exploiting acoustic and syntactic features for automatic prosody labeling in a maximum entropy framework, Audio, Speech, and Language Processing, IEEE Transactions on, IEEE, 2008, 16, 797-811.
Shriberg, E.; Stolcke, A.; Hakkani-Tür, D. & Tür, G., Prosody-based automatic segmentation of speech into sentences and topics, Speech communication, Elsevier, 2000, 32, 127-154.
Beskow, J.; Granström, B. & House, D., Visual correlates to prominence in several expressive modes, Proc. of Interspeech, 2006, 1272-1275.
Cvejic, E.; Kim, J.; Davis, C. & Gibert G. Prosody for the Eyes: Quantifying Visual Prosody Using Guided Principal Component Analysis, Proc. INTERSPEECH, 2010.
Dohen, M.; Loevenbruck, H.; Harold, H. et al. Visual correlates of prosodic contrastive focus in French: Description and inter-speaker variability, Proc. Speech Prosody, 2006.
Graf, H.; Cosatto, E.; Strom, V. & Huang, F., Visual prosody: Facial movements accompanying speech, Int. Conf. on Automatic Face and Gesture Recognition, 2002, 396-401.
Heckmann, M.; Kroschel, K.; Savariaux, C. & Berthommier, F. DCT-based video features for audio-visual speech recognition, Seventh International Conference on Spoken Language Processing (ICSLP), 2002.
Heckmann, M.; Joublin, F. & Goerick, C. Combining Rate and Place Information for Robust Pitch Extraction Proc. Interspeech, 2007, 2765-2768.
Heckmann, M. & Nakadai, K. Robust intonation pattern classification in human robot interaction, Proc. INTERSPEECH, ISCA, 2011.
Jeon, J. & Liu, Y., Syllable-level prominence detection with acoustic evidence, INTERSPEECH, Sep. 26-30, 2010, pp. 1772-1775.
Jeon, J.; Wang, W. & Liu, Y., N-best rescoring based on pitch-accent patterns, Proceedings of the 49th Annual Meeting of the Association for Computational Linguistics: Human Language Technologies-vol. 1, 2011, 732-741.
Tamburini, F. & Wagner, P. On automatic prominence detection for German, Proc. of INTERSPEECH, ISCA, Aug. 27-31, 2007, pp. 1809-1812.
Krahmer, E. & Swerts, M., Audiovisual prosody—introduction to the special issue, Language and speech, 2009, 52, 129-133.
Shriberg, E.; Stolcke, A.; Jurafsky, D.; Coccaro, N.; Meteer, M.; Bates, R.; Taylor, P.; Ries, K.; Martin, R. & Van Ess-Dykema, C., Can prosody aid the automatic classification of dialog acts in conversational speech?, Language and speech, SAGE Publications, 1998, 41, 443.
Rangarajan Sridhar, V.; Bangalore, S. & Narayanan, S., Combining lexical, syntactic and prosodic cues for improved online dialog act tagging, Computer Speech & Language, Elsevier, 2009, 23, 407-422.
Wang, M. & Hirschberg, J., Automatic classification of intonational phrase boundaries, Computer Speech & Language, Elsevier, 1992, 6, 175-196.
Liu, Y.; Shriberg, E.; Stolcke, A.; Hillard, D.; Ostendorf, M. & Harper, M., Enriching speech recognition with automatic detection of sentence boundaries and disfluencies, Audio, Speech, and Language Processing, IEEE Transactions on, IEEE, 2006, 14, 1526-1540.
Munhall, K.; Jones, J.; Callan, D.; Kuratate, T. & Vatikiotis-Bateson, E., Visual prosody and speech intelligibility, Psychological Science, SAGE Publications, 2004, vol. 15, No. 2, pp. 133-137.
Prieto, P.; Pugliesi, C.; Borràs-Comes, J.; Arroyo, E. & Blat, J., Crossmodal Prosodic and Gestural Contribution to the Perception of Contrastive Focus, Proc. INTERSPEECH, Aug. 28-31, 2011, pp. 977-980.
Nöth, E.; Batliner, A.; Kießling, A.; Kompe, R. & Niemann, H., Verbmobil: The use of prosody in the linguistic components of a speech understanding system, IEEE Trans. Speech and Audio Proc., IEEE, Sep. 2000, vol. 8, No. 5, pp. 519-532.
Dagen Wang et al., "An Acoustic Measure for Word Prominence in Spontaneous Speech," IEEE Trans Audio Speech Lang Processing, Feb. 1, 2007, vol. 15, No. 2, pp. 690-701.

* cited by examiner

SPOKEN DIALOG SYSTEM USING PROMINENCE

BACKGROUND OF THE INVENTION

1. Field of the Invention

The invention relates to the domain of speech based human-machine interaction. More precisely it relates to improving a spoken dialog system by incorporating prosodic information contained in the speech signal.

2. Description of Related Art

A spoken dialog system enables the communication between a human and a machine based on speech. Its main components are commonly at least one of a speech recognizer, a text-to-speech (TTS) system, a response generator, a dialog manager, a knowledge base and a natural language understanding module.

Human speech is not only the words spoken but also how they are spoken. This is reflected by prosody, i.e. rhythm, speed, stress, structure and/or intonation of speech, each of which can be used alone or in combination as prosodic cues. Also other features of an utterance can serve as prosodic cues.

Such prosodic cues play a very important role in human-human communication, e.g. they structure utterance in phrases (elements of a clause), emphasize novel information in an utterance, and differentiate between questions or statements.

Different approaches to extract prosodic cues have been proposed. Nevertheless prosodic information is rarely used in spoken dialog systems.

"Utterance" in spoken language analysis typically relates to a smallest unit of speech. It is generally but not always bounded by silence.

In many situations current speech interfaces perform not as desired or expected by a user. They frequently misunderstand words, especially when background noise is present, or when the speaking style differs from the one they expect. In particular they are insensitive to the prosody of speech, the rhythm, speed, stress, structure and/or intonation of speech.

Speech interfaces are already an important component for current cars but also in other areas such as, e.g., mobile telecommunication device control, and their importance will even increase in the future.

However, current speech interfaces are perceived as little intuitive and error prone. One reason for this is that such systems do not analyze speech as humans do. Especially, they are "blind" to prosodic cues. The integration of prosodic cues endows the systems with capabilities which allow them to better understand the user's goals. In particular, the integration of prosodic cues renders the systems more intuitive and hence more robust.

Stressing the words which are the most relevant is a very natural way of talking. By considering this fact, the human-machine dialog is much more natural and hence easier for the human.

As detailed below, this can be especially beneficial in situations where clarifications are necessary from the human. When clarifications occur or are necessary, current systems usually are unaware of which part of the utterance was misunderstood. In the subsequent interpretation of the correction by the human they hence decode the utterance in the same way as they decoded the original utterance. Humans however tend to emphasize the misunderstood term in the correction. By endowing the system with capabilities to extract this emphasis, i.e. the prominence, the system will obtain additional information and the dialog between human and machine will improve.

There is a multitude of approaches to extract prosodic cues in the context of speech processing (cf. documents [1-3]). When used to improve automatic speech understanding this information was extracted from speech corpora and used to improve an automatic transcription of these corpora (cf. documents [4-9]). A very recent system uses prosody to improve recognition scores in broadcast news recognition by scoring the words differently depending on their pitch accent [10]. The prosodic cues of the analyzed broadcast news in this case are solely determined based on the fundamental frequency One prominent case of prosody use is the Verbmobil project (1993-2000) [11]. The target of the project was to allow people speaking different languages to communicate verbally with each other by help of a computer. Hence recognition of an utterance in a source language was performed, the recognized utterance was translated into the target language, which was then re-synthesized and output.

Prosodic cues were used to disambiguate different sentence meanings based on word prominence information and to guide the parsing of the sentence by using information on the prosodic phrasing. The cues deployed were based on fundamental frequency, intensity, and duration.

Other studies showed that the visual channel also conveys prosodic information, especially in the mouth region, the eyebrows and the head movements (cf. documents [12-16]). Few studies exist, where visual prosodic information is automatically extracted using markers in a speaker's face (cf. documents [17-18]).

Document U.S. Pat. No. 7,996,214 describes a system and method of exploiting prosodic features for dialog act tagging. The dialog act (question, hesitation, . . . ) is based on prosodic features.

Document US 2006/0122834 A1 describes an emotion detection device and a method for use in distributed systems. The emotional state of the user is inferred.

In U.S. Pat. No. 7,778,819 a method and apparatus is described for predicting word prominence in speech synthesis. Prominence is estimated from text and used it in speech synthesis.

BRIEF SUMMARY OF THE INVENTION

The invention hence seeks to improve spoken dialog systems, and in particular speech interfaces for human-machine communication. This object is achieved by a method and a system according to the independent claims. Advantageous embodiments are defined in the dependent claims.

In one aspect, the invention presents a method for analyzing speech in a spoken dialog system, comprising the steps of: accepting an utterance by at least one means for accepting acoustical signals, in particular a microphone, analyzing the utterance and obtaining prosodic cues from the utterance using at least one processing engine, wherein the utterance is evaluated based on the prosodic cues to determine a prominence of parts of the utterance, and wherein the utterance is analyzed to detect at least one marker feature, e.g. a negative statement, indicative of the utterance containing at least one part to replace at least one part in a previous utterance, the part to be replaced in the previous utterance being determined based on the prominence determined for the parts of the previous utterance and the replacement parts being determined based on the prominence of the parts in the utterance, and wherein the previous utterance is evaluated with the replacement part(s).

The utterance may be a correction of the previous utterance, and wherein the utterance is a word or sentence.

The prominence can be determined based on a ranking.

The prominence may indicate a degree of importance of parts of an utterance, e.g. the emphasis a speaker sets on parts of the utterance.

The marker feature is detected when at least parts of the previous utterance are repeated.

The part(s) to be replaced in the previous utterance can be used to improve a recognition accuracy by extracting at least one part with a pre-determined prominence from the utterance, e.g. the correction, extracting the part(s) to be replaced in the previous utterance, and comparing at least one recognition hypotheses for the extracted parts and inferring from this comparison a new recognition hypothesis for the part to be replaced of the previous utterance.

The marker feature can be determined by the prominence of the first part of the utterance either by itself or in combination with a lexical analysis of the utterance.

The utterance may be analyzed in form of a speech/acoustical and/or a video signal. The prosodic cues may be either extracted from the speech/acoustical signal, the video signal, e.g. representing a recording of a user's upper body, preferably including the head and face, or a combination of both.

The movements of the user's head, facial muscles, mouth and/or eyebrows can be used to determine the prosodic cues.

A compressive transformation may be applied to the mouth region. A tilt of the head and consequently the mouth region can be corrected prior to applying the transformation, in particular a Discrete Cosine Transformation (DCT).

Reliability for each information channel may be calculated over which the prosodic cues are obtained. An assignment of importance, i.e. a prominence, on the different parts of the utterance can be obtained by adaptively combining the different information channels considering previously calculated reliabilities. The reliability of the video channel may be calculated based on the illumination conditions.

In a further aspect, the invention presents a spoken dialog system, comprising at least one means (20) for accepting acoustical signals, in particular a microphone, for accepting an utterance, at least one processing engine (40) for analyzing the utterance and to obtain prosodic cues from the utterance, wherein the utterance is evaluated based on the prosodic cues to determine a prominence of parts of the utterance, and wherein the utterance is analyzed to detect at least one marker feature, e.g. a negative statement, indicative of the utterance containing at least a part to replace at least a part in a previous utterance, the part to be replaced in the previous utterance being determined based on the prominence determined for the parts of the previous utterance and the replacement parts being determined based on the prominence of the parts in the utterance, and wherein the previous utterance is evaluated with the replacement parts(s).

The system may compose a video accepting means for accepting a visual signal for capturing e.g. a video signal, e.g. a video camera.

BRIEF DESCRIPTION OF THE SEVERAL VIEWS OF THE DRAWINGS

Further aspects of the invention are now described with reference to the drawings.

DETAILED DESCRIPTION OF THE INVENTION

Figure 1:
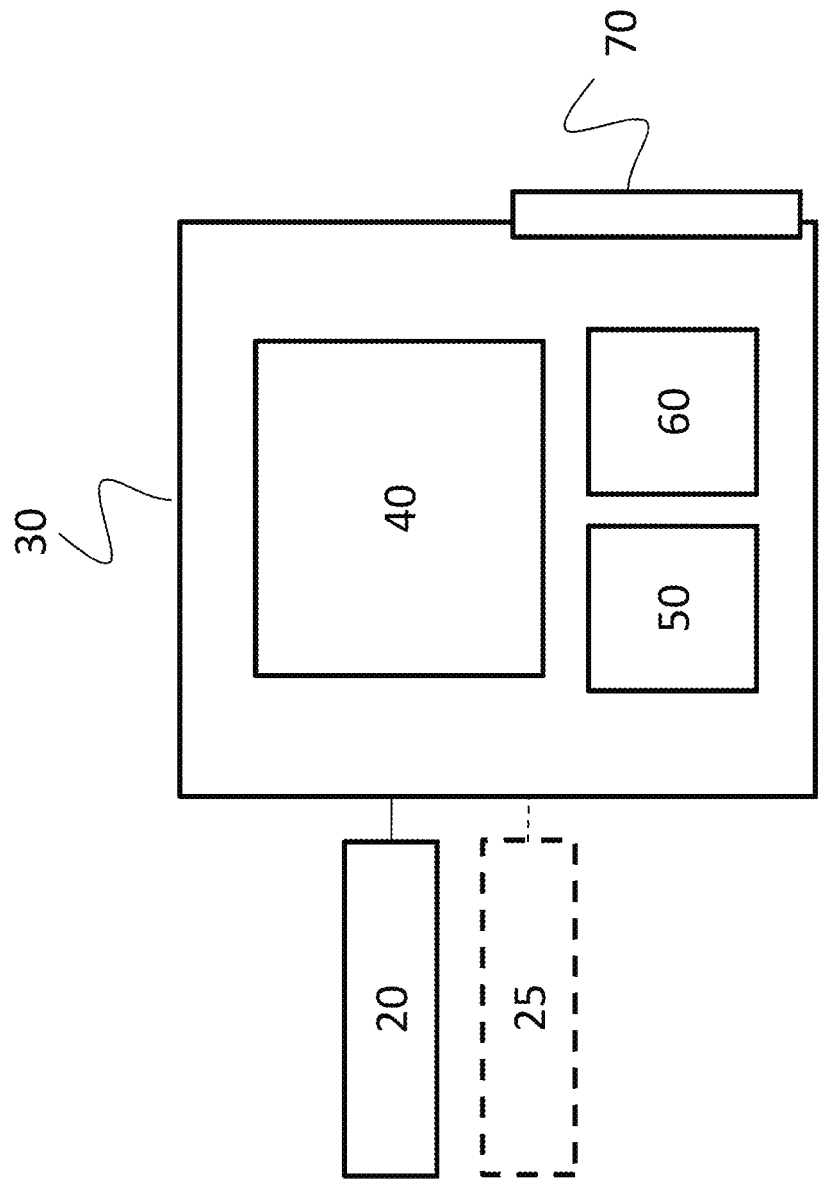
FIG. 1 shows an overview of an exemplary embodiment of the invention.

FIG. 1 shows an overview of an exemplary setup of a spoken dialog system 30 according to the invention. In FIG. 1 shows a user 10 from which an utterance is accepted. This utterance can be accepted by a means 20 for accepting acoustical signals, e.g. a microphone, and, optionally, a means 25 for accepting visual signals, e.g. a camera producing video signals. The spoken dialog system includes a processing engine 40 to process the signals accepted by means 20,25. In particular, the processing engine 40 provides at least one of a speech recognizer, a text-to-speech (TTS) system, a response generator, a dialog manager, a knowledge base and a natural language understanding module, a lexical analyzer module or a combination thereof. While the processing engine 40 is shown as a single block in FIG. 1, it has to be understood that all elements of the processing engine 40 may be realized as separate modules.

Further, the spoken dialog system 30 comprises or is functionally connected to a processing means 50 and a storage means 60. The processing engine employs the processing means 50 and uses the storage means 60 during processing. The spoken dialog system 30 may also comprise an interface 70 for communication to the user 10 or other systems, e.g. a navigation system, a control unit or an assistance system. These systems might also be realized as software applications and hence the interface 70 might be a hardware interface or a software interface.

Typically, the input signals or input patterns to the spoken dialog system 30 are accepted from a sensor, which is then processed by hardware units and software components. An output signal or output pattern is obtained, which may serve as input to other systems for further processing, e.g. for visualization purposes, for navigation, vehicle or robot control or the control of a (mobile) telecommunication device or appliances. The input signal may be supplied by one or more sensors, e.g. for visual or acoustic sensing, but also by the software or hardware interface. The output signal/pattern may be transferred to another processing unit or actor, which may be used to influence the actions or behavior of a robot, vehicle or mobile telecommunication device.

Computations and transformations required by the spoken dialog system 30 may be performed by a processing means 50 such as one or more processors (CPUs), signal processing units or other calculation, processing or computational hardware and/or software, which might also be adapted for parallel processing.

Processing and computations may be performed on standard off-the-shelf (OTS) hardware or specially designed hardware components. A CPU of a processor may perform the calculations and may include a main memory (RAM, ROM), a control unit, and/or an arithmetic logic unit (ALU). It may also address a specialized graphic processor, which may provide dedicated memory and processing capabilities for handling the computations needed.

Also the storage means 60 is used for storing information and/or data obtained, needed for processing and results. The storage means 60 also allows storing or memorizing inputs to the spoken dialog system 30 and knowledge, such as e.g. speech recognition methods, recognition data, recognition hypotheses, . . . deducted therefrom to influence processing of future inputs.

The storage means 60 may be provided by devices such as a hard disk (SSD, HDD, Flash memory), RAM and/or ROM, which may be supplemented by other (portable) storage media such as floppy disks, CD-ROMs, Tapes, USB drives, Smartcards, Pen drives etc. Hence, a program encoding a method according to the invention as well as data acquired, processed, learned or needed in/for the application of the inventive system and/or method may be stored in a respective storage medium.

Figure 2:
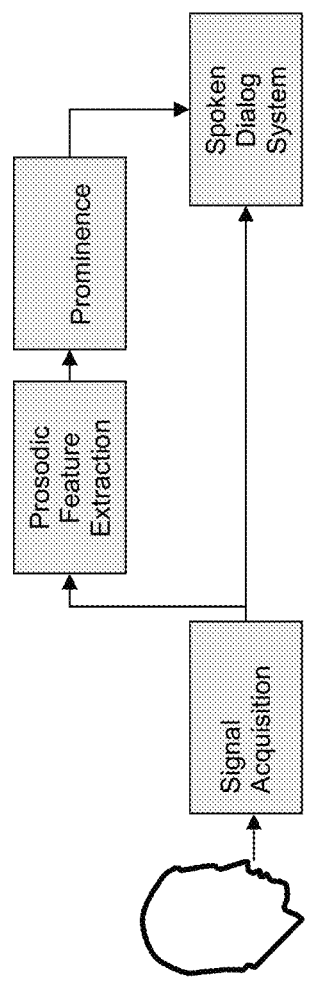
FIG. 2 shows an exemplary system layout of the invention.

In particular, the method described by the invention may be provided as a software program product on a (e.g., portable) physical storage medium which may be used to transfer the program product to a processing system or a computing device in order to instruct the system or device to perform a method according to this invention. Furthermore, the method may be directly implemented on a computing device or may be provided in combination with the computing device. One aspect of the invention is to extract information on the importance of different parts in an utterance by a speaker and to use it in a spoken dialog system, an example of which is shown in FIG. 2. These levels of importance are manifested in the acoustical signal by different level of emphasis set on the corresponding part of the utterance. In linguistics the relative emphasis parts of an utterance are given relative to others is called stress or prominence. In this sense these relative emphasis parts stand out, and are therefore prominent. Prominence is, for example, used to indicate the most informative part of an utterance.

Based on features extracted from the acquired acoustical signals representing the utterance it is possible to assign to each part of the utterance different levels of prominence. The different levels of prominence can then be mapped to a ranks of importance for the utterance as intended by the speaker. A spoken dialog system can then use the information of the importance ranking to improve the dialog with the user.

Figure 3:
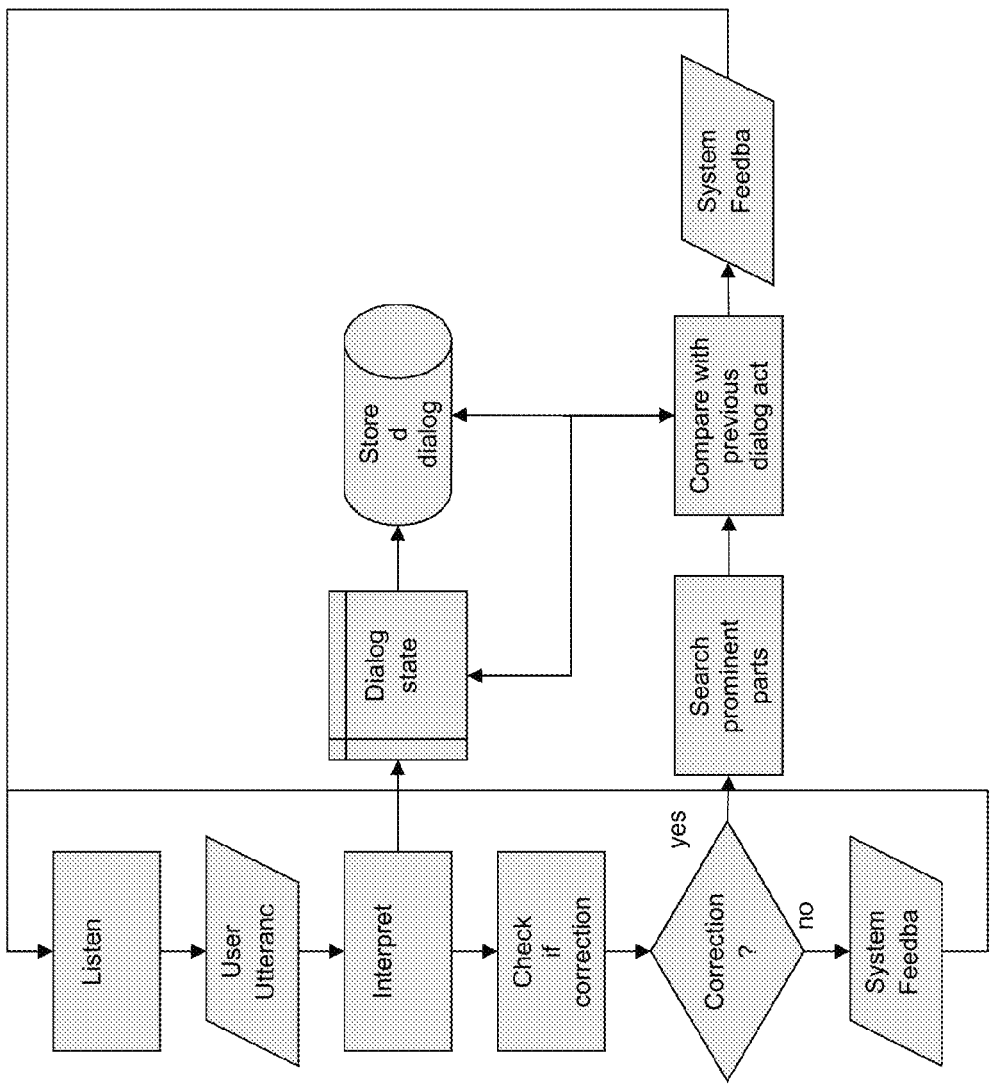
FIG. 3 shows a flow chart of one possible embodiment of the invention.

One possible embodiment of the current invention is to improve a correction dialog as shown in FIG. 3. With current spoken dialog systems, and speech recognition systems in particular, it is quite common that the system misunderstands the user. In some cases the spoken dialog system is able to detect such recognition errors automatically. However, in most cases this happens unnoticed by the system.

When humans communicate with each other they commonly use negative signals as "No", "No, I meant . . . ", "No, I said . . . " or the like to indicate that there was a misunderstanding. Take the following hypothetical communication as an example:
Human A: I want to drive to Maisach
Human B: To which part of Munich do you want to drive?
Human A: No, I want to drive to Maisach!

As illustrated, the communication partners will, subsequent to a misunderstanding, fully or partially repeat what they said previously. In this repetition they tend to make the previously misunderstood term the most prominent one as it is currently the most important one for them (in the example above prominence is indicated by bold font weight).

The human listener will then be able to first infer from the negative signals that there was a misunderstanding and then detect—based on its prominence—the assumingly misunderstood term. In this scenario prosodic cues are not only very important to detect the misunderstood term but also the negative signal. These negative signals are commonly also uttered with a high level of prominence.

As current spoken dialog systems are not able to interpret prosodic cues they have severe difficulties in a situation where a correction is given from a user.

The current invention presents a method to endow a spoken dialog system with capabilities to infer the prominence of different parts of an utterance and use them in the dialog management. When transferring the previous example of a communication between humans to a human machine dialog the system proposed in the invention will be able to detect that there was a misunderstanding in the previous dialog act based on its recognition of the negative signal "No" combined with its high prominence.
Human: I want to drive to Maisach.
Machine: To which part of Munich do you want to drive?
Human: No, I want to drive to Maisach!
Machine: Sorry. To which street in Maisach do you want to drive?

After recognizing the marker feature of the negative signal "No", it will search for an additional term with very high prominence ("Maisach") and infer that this term was misunderstood in the previous utterance. It can then signal to the user that it understood that there was a mistake in the previous dialog act and move on in the dialog with the now corrected term. Here prominence can also be used in the feedback to the user to further highlight that the system has identified the mistake. Such a strategy is also used by humans. Overall such a system will feature a more efficient, i.e. quicker dialog, with less turns and also a more natural and intuitive dialog.

It has to be understood that the marker feature can also be another feature, especially in another language. It might also be a certain intonation, stress, structure, . . . of an utterance.

As well, the detection that there is a misunderstanding in general and which part of the utterance was misunderstood does not require a correct recognition of the relevant parts of the utterance. This information can be inferred from the prominence of the respective parts, e.g. a very prominent segment at the beginning of an utterance is a good indication for a correction utterance.

Current spoken dialog systems will not be able to detect that there was a misunderstanding and as a consequence will not easily be able to use the context information from the previous dialog act.

However, in such a correction dialog the system has usually access to two variants of the same word (e.g. "Maisach", the misunderstood one and the corrected one). This can be used to obtain a better recognition after the word was uttered the second time.

For finding both instances of this word it is not necessary to recognize the word. The invention instead uses the prominence of the word in the correction utterance to detect it in the utterance previously misunderstood/misinterpreted. Once one instance is found it is now possible to use rather simple pattern matching techniques to find the same word again in the previous dialog act. This is possible as in this case the same speaker in an at least very similar environment has uttered the word.

Once this is achieved the most likely and several less likely recognition hypotheses for both of these instances of the word can be calculated. When comparing these hypotheses it is possible to gain new information and improve the overall recognition accuracy. In both cases the order of hypotheses with recognition scores in brackets was e.g. "Munich"(0.9), "Maisach"(0.8), "Mainz"(0.5). Then just selecting the second most likely would be a good strategy as "Munich" was already identified as being wrong. In a case where they differ e.g. original: "Munich"(0.9), "Mainz"(0.8), "Maisach"(0.7), correction: "Munich"(0.9), "Maisach"(0.7) "Mainz"(0.5) then selecting "Maisach" would be a good strategy because it obtained the combined highest score.

A prerequisite for correctly interpreting the correction is the capacity of the system to store at least one, in one embodiment several, previous dialog acts. This can either be in the format as they were recorded or in an abstracted feature representation.

To obtain a measure for the importance of a part of an utterance, i.e. its prominence, different measures from the acoustic signal have been proposed:

Spectral intensity: The energy in certain frequency bands relative to that of others correlates well with prominence Duration: The lengthening of a syllable is characteristic for prominence Pitch patterns: Certain pitch patterns are indicative for prominence For some of these features the fundamental frequency, whose percept is called pitch, has to be extracted and its shape has to be classified [19, 20].

Spectral intensity represents a reliable and computational not very costly way to extract prominence information from the speech signal [21, 22].

Figure 4:
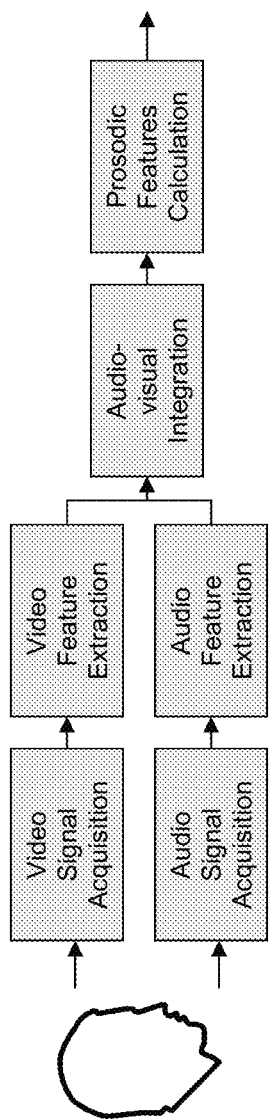
FIG. 4 shows a block diagram of an extraction and integration of prosodic features of one possible embodiment of the invention.

In particular in the current invention not only the acoustical signal is used but also the movements of the speaker's head and face (compare FIG. 4). It has previously be shown that movements of the eyebrows, the head and the mouth region convey important information on the prominence of parts of an utterance [12-14]. Generally, prosodic cues can be derived from facial muscles or other facial or body features, e.g. the movement of arms or hands, can be used. Even gestures can be used, e.g. to detect a marker feature, such as a specific, e.g. negative, body posture or a specific movement or movement pattern.

Methods for the extraction of such features are also available [17, 18, 23]. Very powerful ways to extract visual features from the face are transformation based approaches as e.g. the Discrete Cosine Transformation (DCT) [24]. In this case also a head rotation estimation and subsequent correction thereof is beneficial. This can e.g. be obtained by detecting the user's eyes or by calculating the symmetry axis of the mouth region. Alternative transformations suited to this task are e.g. Principal Component Transformation (PCA) and Fourier Transformation.

The combination of acoustic and visual information in the determination of prominence is not known from prior art and manifests a part of this invention. In particular we propose to determine reliability measures for the acoustical and visual channel and perform the integration of the different channels depending on their individual reliability. Different reliability measures can be used, e.g. based on probabilistic models of the values of the cues and a comparison of the current value with the model.

Hence, the invention uses prosodic speech features in a human machine dialog to infer the importance of different parts of an utterance and to use this information to make the dialog more intuitive and more robust.

The dialog is more intuitive because users can speak more natural, i.e. using prosody, and the system also uses prosodic cues to give feedback to the user. The higher robustness is thereby achieved by reducing the recognition errors.

One scenario is a situation where a user utters a phrase, the system misunderstands the phrase, the user repeats the utterance for the system, thereby changing the prosody of the utterance which makes the misunderstood part more prominent in the utterance, a strategy commonly used when humans speak to each other, the system determines the most prominent part of the correction utterance, hence the previously misunderstood part, the system extracts the corresponding segment from the original utterance, e.g. by pattern matching with the prominent part in the correction, the system uses this information to determine a better hypothesis on what was really said by the user.

An important aspect of the invention is the combination of acoustic and visual features for the determination of the importance, i.e. prominence, of the different parts of the utterance. Hereby the combination of the different information streams is adapted to the reliability of the different streams.

In particular, the integration of prosodic cues renders the systems more intuitive and hence more robust. Stressing the words which are the most relevant is a very natural way of talking. By considering this the man-machine dialog is much more natural and hence easier for the human. As detailed, this can be especially beneficial in situations where clarifications are necessary from the human. When such clarifications are happening current systems usually are unaware that the last utterance was a clarification and which part of the utterance was misunderstood. In the subsequent interpretation of the correction they hence decode the utterance in the same way as they decoded the original utterance. Humans however tend to indicate such a correction utterance prosodically and emphasize the misunderstood term in the correction. By detecting the correction and subsequent extracting this emphasis, i.e. the prominence, the system will obtain additional information and the dialog between human and machine will improve.

SUMMARY

The invention presents a System which determines the different degrees of importance a speaker sets on parts of an utterance from a speech signal based on prosodic speech features and uses this information to improve a man machine dialog by integrating it into a spoken dialog system.

The importance of a part of an utterance is determined by its prominence. The information on the prominence of a part of the utterance is used in a situation where the system misunderstood the user in a previous dialog act, the system detects that such a misunderstanding has happened from the current dialog act in which the user repeated at least part of the previous utterance, the system detects the misunderstood part of the utterance, the system uses this information to improve the recognition of this part of the utterance, and where the system uses the acquired information in the dialog management.

The information on the misunderstood part is used to improve the recognition accuracy by extracting the emphasized, part from the repetition of the utterance, i.e. the correction, extracting the misunderstood part in the original utterance e.g. by pattern matching with the part extracted from the correction, and comparing the N highest recognition hypotheses of the segments extracted in a. or b. and inferring from this comparison a new recognition hypothesis for the part of the utterance in question.

The detection of a misunderstanding in the previous dialog act uses the prominence of the first part of the last user response either by itself or in combination with a lexical analysis of the utterance. The system after having detected a previous misunderstanding uses prosody to highlight the previously misunderstood and now corrected part of the utterance.

Nomenclature

Spoken Dialog System

A Spoken dialog system is a dialog system delivered through voice. It commonly has at least one of the following components, or a combination thereof:

Speech recognizer
Text-to-speech system
Response generator
Dialog manager
Knowledge base
Natural language understanding module Prosody
The rhythm, stress, and intonation of speech Prominence
The relative emphasis that may be given to certain syllables in a word, or to certain words in a phrase or sentence Stress
See prominence

REFERENCES

[1] Wang, D. & Narayanan, S., An acoustic measure for word prominence in spontaneous speech, *Audio, Speech, and Language Processing, IEEE Transactions on, IEEE*, 2007, 15, 690-701

[2] Sridhar, R.; Bangalore, S. & Narayanan, S., Exploiting acoustic and syntactic features for automatic prosody labeling in a maximum entropy framework, *Audio, Speech, and Language Processing, IEEE Transactions on, IEEE*, 2008, 16, 797-811

[3] Jeon, J. & Liu, Y., Syllable-level prominence detection with acoustic evidence, *INTERSPEECH*, 2010

[4] Wang, M. & Hirschberg, J., Automatic classification of intonational phrase boundaries, *Computer Speech & Language, Elsevier*, 1992, 6, 175-196

[5] Shriberg, E.; Stolcke, A.; Jurafsky, D.; Coccaro, N.; Meteer, M.; Bates, R.; Taylor, P.; Ries, K.; Martin, R. & Van Ess-Dykema, C., Can prosody aid the automatic classification of dialog acts in conversational speech?, *Language and speech, SAGE Publications*, 1998, 41, 443

[6] Shriberg, E.; Stolcke, A.; Hakkani-Tur, D. & Tur, G., Prosody-based automatic segmentation of speech into sentences and topics, *Speech communication, Elsevier*, 2000, 32, 127-154

[7] Ang, J.; Liu, Y. & Shriberg, E., Automatic dialog act segmentation and classification in multiparty meetings, *Proc. ICASSP*, 2005, 1, 1061-1064

[8] Liu, Y.; Shriberg, E.; Stolcke, A.; Hillard, D.; Ostendorf, M. & Harper, M., Enriching speech recognition with automatic detection of sentence boundaries and disfluencies, *Audio, Speech, and Language Processing, IEEE Transactions on, IEEE*, 2006, 14, 1526-1540

[9] Rangarajan Sridhar, V.; Bangalore, S. & Narayanan, S., Combining lexical, syntactic and prosodic cues for improved online dialog act tagging, *Computer Speech & Language, Elsevier*, 2009, 23, 407-422

[10] Jeon, J.; Wang, W. & Liu, Y., N-best rescoring based on pitch-accent patterns, Proceedings of the 49*th Annual Meeting of the Association for Computational Linguistics: Human Language Technologies*-Volume 1, 2011, 732-741

[11] Nöth, E.; Batliner, A.; Kießling, A.; Kompe, R. & Niemann, H., Verbmobil: The use of prosody in the linguistic components of a speech understanding system, *IEEE Trans. Speech and Audio Proc., IEEE*, 2000, 8, 519-532

[12] Graf, H.; Cosatto, E.; Strom, V. & Huang, F., Visual prosody: Facial movements accompanying speech, *Int. Conf. on Automatic Face and Gesture Recognition*, 2002, 396-401

[13] Munhall, K.; Jones, J.; Callan, D.; Kuratate, T. & Vatikiotis-Bateson, E., Visual prosody and speech intelligibility, *Psychological Science, SAGE Publications*, 2004, 15, 133

[14] Beskow, J.; Granström, B. & House, D., Visual correlates to prominence in several expressive modes, *Proc. of Interspeech*, 2006, 1272-1275

[15] Krahmer, E. & Swerts, M., Audiovisual prosody-introduction to the special issue, *Language and speech*, 2009, 52, 129-133

[16] Prieto, P.; Pugliesi, C.; Borràs-Comes, J.; Arroyo, E. & Blat, J., Crossmodal Prosodic and Gestural Contribution to the Perception of Contrastive Focus, *Proc. INTERSPEECH*, 2011

[17] Dohen, M.; Lœvenbruck, H.; Harold, H. et al. Visual correlates of prosodic contrastive focus in French: Description and inter-speaker variability, *Proc. Speech Prosody*, 2006

[18] Cvejic, E.; Kim, J.; Davis, C. & Gibert, G. Prosody for the Eyes: Quantifying Visual Prosody Using Guided Principal Component Analysis, *Proc. INTERSPEECH*, 2010

[19] Heckmann, M.; Joublin, F. & Goerick, C. Combining Rate and Place Information for Robust Pitch Extraction Proc. *INTERSPEECH*, 2007, 2765-2768

[20] Heckmann, M. & Nakadai, K. Robust intonation pattern classification in human robot interaction, *Proc. INTERSPEECH, ISCA*, 2011

[21] Tamburini, F. & Wagner, P. On automatic prominence detection for German, *Proc. of INTERSPEECH, ISCA*, 2007

[22] Schillingmann, L.; Wagner, P.; Munier, C.; Wrede, B. & Rohlfing, K., Using Prominence Detection to Generate Acoustic Feedback in Tutoring Scenarios *INTERSPEECH, ISCA*, 2011

[23] Christian Lang, Sven Wachsmuth, M. H. H. W. Facial Communicative Signals—Valence Recognition in Task-Oriented Human-Robot-Interaction, *Journal of Social Robotics*, accepted for publication

[24] Heckmann, M.; Kroschel, K.; Savariaux, C. & Berthommier, F. DCT-based video features for audio-visual speech recognition, *Seventh International Conference on Spoken Language Processing (ICSLP)*, 2002

The invention claimed is:

1. A method for analyzing speech in a spoken dialog system, comprising the steps of:
   accepting an utterance by at least one means for accepting acoustical signals, in particular a microphone,
   analyzing, by a computer processor, the utterance and obtaining prosodic cues from the utterance using at least one processing engine,
   wherein the utterance is evaluated based on the prosodic cues to determine a prominence of parts of the utterance, and wherein the utterance is analyzed to detect at least one marker feature indicative of the utterance containing at least one part to replace at least one part in a previous utterance, the part to be replaced in the previous utterance being determined based on the prominence determined for the parts of the previous utterance and the replacement parts being determined based on the prominence of the parts in the utterance, and wherein the previous utterance is evaluated with the replacement part(s).

2. The method of claim 1, wherein the utterance is a correction of the previous utterance, and wherein the utterance is a word or sentence.

3. The method of claim 1, wherein the prominence is determined based on a ranking.

4. The method of claim 1, wherein the prominence indicates a degree of importance of parts of an utterance, e.g. the emphasis a speaker sets on parts of the utterance.

5. The method of claim 1, wherein the marker feature is detected when at least parts of the previous utterance are repeated.

6. The method of claim 1, wherein the part(s) to be replaced in the previous utterance is/are used to improve a recognition accuracy by extracting at least one part with a pre-determined prominence from the utterance, e.g. the correction, extracting the part(s) to be replaced in the previous utterance, and comparing at least one recognition hypotheses for the extracted parts and inferring from this comparison a new recognition hypothesis for the part to be replaced of the previous utterance.

7. The method of claim 1, wherein the marker feature is determined by the prominence of the first part of the utterance either by itself or in combination with a lexical analysis of the utterance.

8. The method of claim 1, wherein the utterance is analyzed in form of a speech/acoustical and/or a video signal, and wherein the prosodic cues are either extracted from the speech/acoustical signal, the video signal, e.g. representing a recording of a user's upper body, preferably including the head and face, or a combination of both.

9. The method of claim 1, wherein movements of the user's head, facial muscles, mouth and/or eyebrows are used to determine the prosodic cues.

10. The method of claim 1, wherein a compressive transformation is applied to a mouth region, and wherein a tilt of a head and consequently the mouth region is corrected prior to applying the transformation, in particular a Discrete Cosine Transformation (DCT).

11. The method of claim 1, wherein a reliability for each of different information channels is calculated over which the prosodic cues are obtained, wherein an assignment of importance, i.e. prominence, on the different parts of the utterance is obtained by adaptively combining the different information channels considering previously calculated reliabilities, and wherein the reliability of the information channel is calculated based on illumination conditions.

12. A spoken dialog system, comprising
- at least one means for accepting acoustical signals, in particular a microphone, for accepting an utterance,
- at least one processing engine for analyzing, by a computer processor, the utterance and to obtain prosodic cues from the utterance,
- wherein the processing engine is adapted to evaluate the utterance based on the prosodic cues to determine a prominence of parts of the utterance, and wherein the processing engine is adapted to analyze the utterance to detect at least one marker feature indicative of the utterance containing at least a part to replace at least a part in a previous utterance accepted by said acoustical signal means, the part to be replaced in the previous utterance being determined based on the prominence determined for the parts of the previous utterance and the replacement parts being determined based on the prominence of the parts in the utterance, and wherein the previous utterance is evaluated with the replacement part(s).

13. A spoken dialog system, comprising:
- at least one means for accepting acoustical signals, in particular a microphone, for accepting an utterance,
- at least one processing engine for analyzing, by a computer processor, the utterance and to obtain prosodic cues from the utterance,
- wherein the processing engine is adapted to evaluate the utterance based on the prosodic cues to determine a prominence of parts of the utterance, and wherein the processing engine is adapted to analyze the utterance to detect at least one marker feature indicative of the utterance containing at least a part to replace at least a part in a previous utterance accepted by said acoustical signal means, the part to be replaced in the previous utterance being determined based on the prominence determined for the parts of the previous utterance and the replacement parts being determined based on the prominence of the parts in the utterance, and wherein the previous utterance is evaluated with the replacement part(s); and
- wherein the system is configured to perform a process comprising:
- accepting the utterance by the at least one means for accepting acoustical signals, in particular the microphone,
- analyzing the utterance and obtaining the prosodic cues from the utterance using the at least one processing engine,
- wherein the utterance is evaluated based on the prosodic cues to determine the prominence of parts of the utterance, and wherein the utterance is analyzed to detect the at least one marker feature indicative of the utterance containing the at least one part to replace the at least one part in the previous utterance, the part to be replaced in the previous utterance being determined based on the prominence determined for the parts of the previous utterance and the replacement parts being determined based on the prominence of the parts in the utterance, and wherein the previous utterance is evaluated with the replacement part(s).

14. The system of claim 12, comprising a means for accepting visual signals for capturing a video signal.

* * * * *